W. CHAMBERS.
GOVERNOR VALVE.
No. 28,065. Patented May 1, 1860.
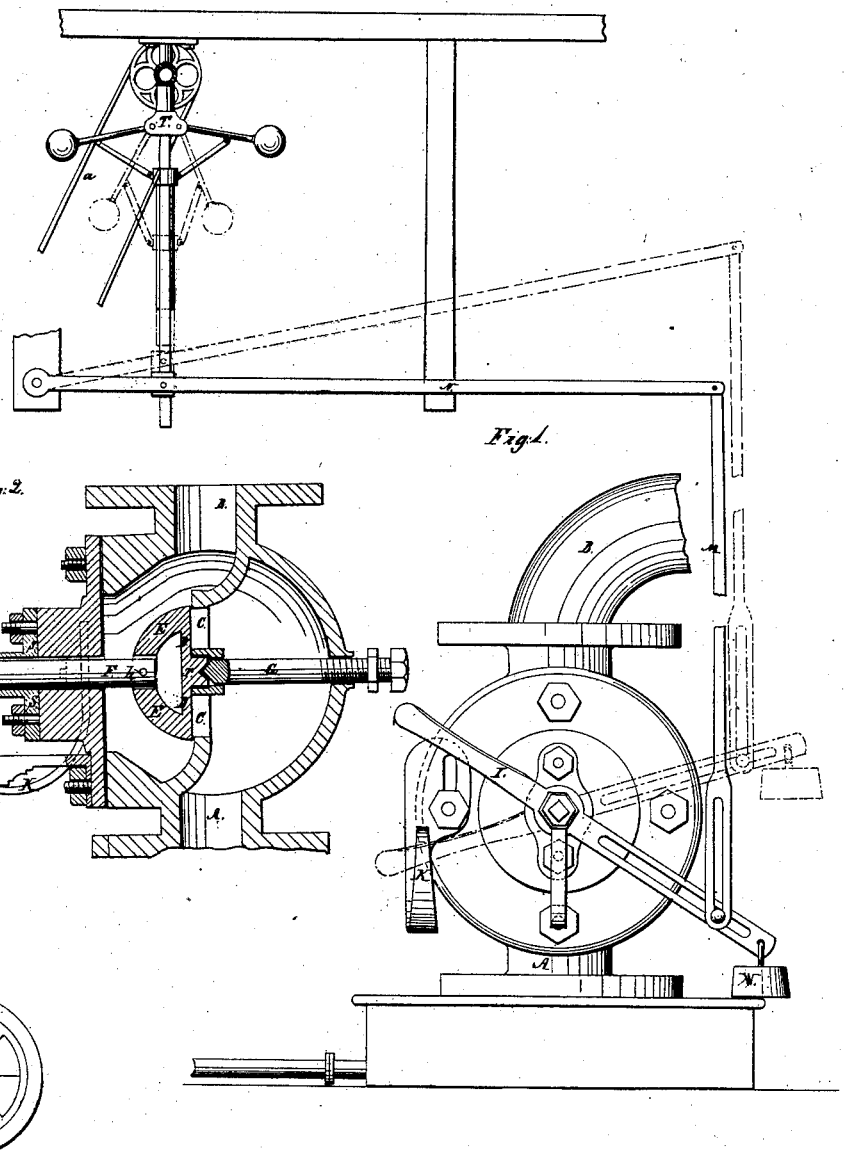

UNITED STATES PATENT OFFICE.

WILLIAM CHAMBERS, OF MUSCATINE, IOWA.

GOVERNOR-VALVE FOR STEAM-ENGINES.

Specification of Letters Patent No. 28,065, dated May 1, 1860.

*To all whom it may concern:*

Be it known that I, WILLIAM CHAMBERS, of Muscatine, in the county of Muscatine and State of Iowa, have invented a new and useful Improvement in Governor-Valves; and I do hereby declare that the following is a full, clear, and exact description of the same, reference being had to the accompanying drawings, forming a part of this specification, in which—

Figure 1, is an outside view. Fig. 2, a longitudinal central section. Fig. 3, a front view, and Fig. 4, a rear view of the valve.

Similar letters of reference, in each of the several figures indicate corresponding parts.

The nature of my invention consists first, in arranging a disk valve and valve rod between two pointed set screws, and hinging the valve to its rod by means of a knuckle joint, in such a manner that the valve may be easily adjusted in relation to its seat so as to reduce the friction to a minimum while there is a perfect steam-tight fit between the valve and its seat; second, in combining the valve rod with a weighted lever and a spring catch, so that the flow of steam from the boiler to the steam chest shall be shut off whenever the engine attains an excessive speed while the valve will admit a greater or less supply of steam at any decrease or increase of speed respectively.

To enable others skilled in the art, to make and use my invention, I will proceed to describe its construction and operation.

A, represents the pipe communicating with the steam chest; B, the pipe leading to the boiler, C, the valve seat which is provided with two openings *a*.

D, represents the disk valve which has two openings *b*, corresponding to those of the seat. The valve has a stirrup E, on its rear side, the hub of which is hinged to the valve rod F, by means of a pin *n*, in the manner of a knuckle joint so that the valve can swing on said pin. The valve has on its front side, a cylindrical projection *r*, passing through a hole in the center of the seat, sufficiently large to allow the projection to play in said hole. This projection has a conical cavity in its end into which fits the pointed or conical end of the set screw G. The valve rod passes through a stuffing box S, and its outer end bears against the point of a set screw L. Thus the valve and its rod are held between the points of the set screws G, and L, and are free to turn on said points. These set screws afford also the means of regulating the position of the valve in relation to its seat, as by loosening one and tightening the other of these set screws, the valve can be set more or less close to its seat.

The knuckle joint, in combination with the conical bearing of the valve against the set screw G, allows the valve to adapt itself easily to the seat and produce a perfect fit in all points of the circumference of the valve. If the valve were fast to the valve rod, it could not fit the seat, or at least the pressure between valve and valve seat could not be equal in all points of the surfaces in contact, and consequently the friction would have to be considerably increased to produce a perfect fit, if the valve rod should happen not to be concentric in its stuffing box or should not be exactly at right angles to the face of the valve.

I, represents a lever which is fastened to the rod F, by a clamp screw. K, is a spring catch to take hold of said lever and keep the valve closed whenever the machine has attained an excessive speed, as will be described hereafter.

W, is a weight which is hung to the slotted end of this lever I, to bear down this end of the lever and keep it at the lowest point of the slot in rod M, which latter connects the lever end to a governor regulating device. This device may consist of a lever N, which is pivoted to the rod M, at one end and has its fulcrum at O. Some point of this lever N, may be connected to the usual governor T, by means of a link joint.

The operation of the apparatus is as follows: When the engine runs at average speed, the valve has such a position that its openings *b*, *b*, and those in the seat *a*, *a*, overlap each other about one-half. Whenever the speed diminishes, the balls of the governor fall and cause a downward motion of the lever N and rod M, the weight W, attached to the lever I, causes a corresponding downward motion of this end of the lever. The latter being fastened to the valve rod F, causes this rod to rotate together with the valve—in consequence of which the overlapping of the openings *a*, *a*, *b*, *b*, will increase and consequently admit a larger flow of steam from the boiler to the engine thus increasing the speed. If, however, the speed increases and the balls of the governor rise, the end of the lever N, connected with rod M, rises also and causes an upward motion of that end of the lever I, to which is hung the weight W, and by this means the valve rod and valve are rotated sufficiently to decrease the overlapping of the openings in the valve and its seat, in consequence of which there will be a less flow of steam and a decrease of speed. Should the main belt Q, connecting the engine with the machinery, break or run off the pulley, the governor balls will assume their extreme highest position and the end of the lever I, with its weight will be raised until the spring catch K, takes hold of the other end in which case no portion of the openings in the valve and its seat will coincide and the steam will be shut off entirely. Thus the engine will be stopped by the automatic action of this valve whenever the main belt should break or any similar accident occur with the machinery.

What I claim as my invention and desire to secure by Letters Patent, is—

1. In the construction of a governor valve of the character herein described, the combination of the knuckle joint h, and pointed set screws G, L, in the manner and for the purpose herein described.

2. The combination and arrangement with the governor valve D, and its rod F, of a weighted lever I, and spring catch K, the whole being constructed and operating in the manner and for the purpose herein described.

WM. CHAMBERS.

Witnesses:
GOODWIN Y. AT LEE,
R. W. FENWICK.